Figure 1:
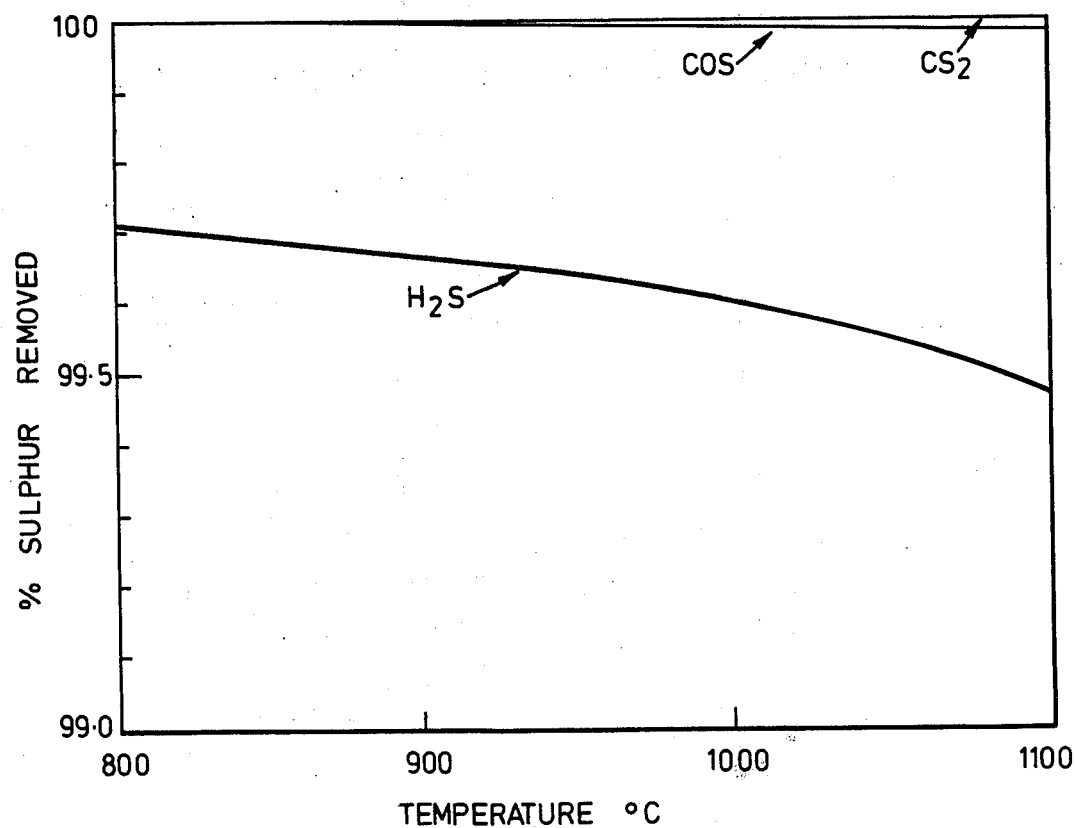

United States Patent [19]

Moss et al.

[11] 3,969,089

[45] July 13, 1976

[54] MANUFACTURE OF COMBUSTIBLE GASES

[75] Inventors: Gerald Moss, Oxford; John William Thomas Craig, Wantage, both of England

[73] Assignee: Exxon Research and Engineering Company, Linden, N.J.

[22] Filed: June 9, 1975

[21] Appl. No.: 584,963

Related U.S. Application Data

[63] Continuation of Ser. No. 305,319, Nov. 10, 1972, abandoned.

[30] Foreign Application Priority Data

Nov. 12, 1971  United Kingdom............... 52656/71

[52] U.S. Cl................................ 48/197 R; 48/203; 48/212; 423/244
[51] Int. Cl.²......................... C10J 3/54; C01B 2/14
[58] Field of Search................ 48/197 R, 202, 206, 48/211, 213, 214, 215, 200, 201, 203, 210, 212; 423/244

[56] References Cited
UNITED STATES PATENTS

| | | | |
|---|---|---|---|
| 3,481,834 | 12/1969 | Squires | 48/202 |
| 3,597,327 | 8/1971 | Squires | 48/197 R X |
| 3,784,676 | 1/1974 | Moss | 48/212 |
| 3,807,090 | 4/1974 | Moss | 48/211 X |
| 3,870,480 | 3/1975 | Moss | 48/197 R X |

FOREIGN PATENTS OR APPLICATIONS 1,183,937   3/1970   United Kingdom

*Primary Examiner*—Robert L. Lindsay, Jr.
*Assistant Examiner*—Peter F. Kratz
*Attorney, Agent, or Firm*—Wayne Hoover

[57] ABSTRACT

Substantially sulfur-free combustible fuel gas under superatmospheric pressure is produced by partial combustion or gasification under superatmospheric pressure of a sulfur-containing solid, liquid or gaseous fuel. The gasification is effected within a fluidized bed of particles containing alkaline earth metal compounds (e.g. the oxides) which are capable of reacting with, and of fixing, the fuel sulfur as sulfides under reducing conditions. Sulfide-containing particles are exposed to an oxidizing atmosphere and the sulfides are thereby converted to oxides with the liberation of $SO_2$ in useful concentrations, and with the liberation of heat. Particles containing regenerated oxides are re-used for fixing more sulfur during fuel gasification. Expedients are described by which it is ensured that the sulfur-fixing activity of the particles is substantially maintained and that the temperatures of the particles during sulfur-fixing and regeneration are maintained within predetermined ranges. The pressurized sulfur-free fuel gas may be directly used to power a gas turbine.

8 Claims, 11 Drawing Figures

EQUILIBRIUM REMOVAL EFFICIENCIES FOR SULPHUR COMPOUNDS DURING GASIFICATION.

EQUILIBRIUM SO₂ PARTIAL PRESSURES FOR THE REACTION OF O₂ WITH CaS (800°C to 1000°C)

EFFECT OF TEMPERATURE ON EQUILIBRIUM $SO_2$ PARTIAL PRESSURE FOR REACTION OF $SO_2$ WITH LIME UNDER REDUCING CONDITIONS

EFFECT OF TEMPERATURE AND PRESSURE ON CONVERSION OF $CO_2$ TO CO IN PRESENCE OF CARBON

EQUILIBRIUM $SO_2$ PARTIAL PRESSURES FOR THE REACTION OF $O_2$ WITH CaS (900°C to 1200°C)

MANUFACTURE OF COMBUSTIBLE GASES

This is a continuation of application Ser. No. 305,319, filed Nov. 10, 1972, and now abandoned.

The present invention relates to the manufacture of substantially sulphur-free combustible gases ("fuel gas").

It is already disclosed in U.K. patent specification 1,183,937 and in U.K. patent specification 1,336,563 that a sulphur-containing fuel may be converted, inter alia, to substantially sulphur-free fuel gases by partial combustion of the fuel in a reactor bed of fluidized particles comprising alkaline earth metal oxide(s) at temperatures usually in the range of 800° to 1100°C, the sulphur of the fuel being fixed in the particles as solid sulphur compounds of the alkaline earth metal(s). The fuels which may thus be treated range from sulphur-containing hydrocarbon gases through to fuel oils, tars, shales, lignites and coals and coal derivatives such as cokes and chars. Substantially sulphur-free fuel gas leaves the reactor bed, and the sulphur-fixing ability of the particles in the reactor bed is substantially maintained by passing particles from the reactor bed, continuously or intermittently, to a regenerator wherein the particles are subjected to a regeneration process. In a preferred form, regeneration process is performed by fluidizing the sulphur-containing particles in an oxidizing gas (e.g. air) at temperatures usually limited within the range of 800° to 1100°C and during the exothermic reaction which occurs, sulphur dioxide is evolved in a useful concentration. Particles are returned to the reactor bed from the regenerator after exposure to the oxidizing gas.

In preferred embodiments of apparatus for the production of substantially sulphur-free fuel gas and for the regeneration of the sulphur-containing particles, the reactor bed and regenerator bed are contained in respective vessels or compartments of a vessel, and fluidizing oxygen-containing gas (e.g. air) supplied to the beds of the reactor and regenerator from a distributor beneath the beds.

The preferred alkaline earth metal oxide is either calcined limestone or calcined dolomite, and taking, by way of example, the active sulphur-fixing agent in the reactor to be calcium oxide or lime, the main reactions by which the sulphur from the fuel is fixed can be summarized as follows:

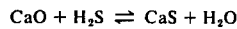 1.

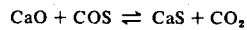 2.

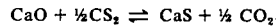 3.

When the particles (hereinafter referred to from time to time as the stone) containing the sulphurized alkaline earth metal oxide are passed to the regenerator, the reactions which take place to regenerate the sulphur-fixing activity of the stone and to release sulphur therefrom can be summarized as follows:

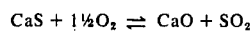 4.

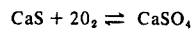 5.

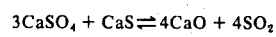 6.

Although reaction (6) is endothermic, reactions (4) and (5) are exothermic and overall, and the regeneration procedure evolves considerable quantities of heat.

It has now been found, in accordance with one aspect of this invention, that as the pressure in the reactor is raised, the amount of sulphur which can be fixed in a given amount of stone is increased, and this leads to a number of advantages. Thus, when the reactor is operated at atmospheric pressure or thereabouts, the maximum desirable weight of sulphur which can be fixed in the stone without significantly increasing any sulphur content of the fuel gas thus produced is about 5 wt.% of the active material of the stone: at sulphur loadings in excess of this level, the combustible gases leaving the reactor bed tend to be less sulphur-free as the sulphur loading is increased, whereas when the reactor pressure is increased, the sulphur loading can be increased without producing fuel gases which are not substantially sulphur-free. Among the benefits secured by operating at pressures well in excess of atmospheric pressure, such as 10 atmospheres or up to 25 atmospheres, are an increased quantity of fuel gas from a reactor of a given size, a decrease in the number of regeneratory cycles of the stone for each unit weight of sulphur fixed by the reactions in the reactor, it having been found that the useful life of the stone depends at least to some extent on the number of regeneratory cycles to which it has been subjected, and a fuel gas which can be employed for direct combustion in a gas turbine without precompression.

The present invention provides a method of producing substantially sulphur-free combustible fuel gas at a predetermined superatmospheric pressure from a sulphur-containing fuel, the method comprising feeding the sulphur-containing fuel into a bed of particles comprising alkaline earth metal oxide contained within a reactor, the particles being fluidized by an upwardly flowing stream of an oxygen-containing gas under a pressure substantially equal to the predetermined superatmospheric pressure, the rate of supply of the oxygen-containing gas and the partial pressure or concentration of oxygen therein being so adjusted in relation to the fuel feed rate that the oxygen supplied is insufficient for complete combustion of the fuel, whereby the sulphur-containing fuel is partially combusted at temperatures in the range of 800° to 1000°C to form substantially sulphur-free combustible gas and the sulphur of the sulphur-containing fuel is fixed in particles of the bed as alkaline earth metal sulphide by reaction with alkaline earth metal oxide in the particles, recovering substantially sulphur-free combustible gas from the reactor bed, transferring particles from a first region of the reactor bed to a first region of a regenerator wherein particles are contained and contacted with an upwardly flowing stream of an oxygen-containing gas whereby alkaline earth metal sulphide is converted to alkaline earth metal oxide with the liberation of sulphur dioxide, the rate of supply of oxygen-containing gas and the partial pressure or concentration of oxygen therein being such that the temperature in the regenerator bed is between 1035°C and 1300°C, monitoring the temperature of the regenerator bed, deriving a signal representative of the regenerator bed temperature, providing a heat sink material in the regenerator bed at a rate which increases with increasing temperature in the regenerator and which decreases with decreasing temperature therein whereby to maintain said regenerator bed temperature at temperatures between 1035°C and 1300°C, transferring particles from a second region of the regenerator bed to a second region of the reactor bed whereby alkaline earth metal oxide in the particles thus transferred from the regenerator bed may be re-used in the reactor bed, causing off-gases from the regenerator bed to leave the regenerator, monitoring and deriving a signal representative of the composition of the regenerator off-gas, and adjusting the rate of supply of oxygen of the oxygen-containing gas to the regenerator whereby substantially to control the composition of the regenerator off-gas and the signal representative thereof.

A preferred range of operating temperatures in the reactor is from 860°C to 1000°C and a preferred temperature range in the regenerator is from 1100°C to 1220°C.

The method of the present invention may be performed in apparatus generally of the type described in U.K. patent specification 1,336,563 — e.g., the reactor may be a vessel or part of a vessel provided with a distributor towards its base through which the oxygen containing gas is distributed into the fluidized bed above the distributor, and the regenerator may be a vessel or part of a vessel of the same general construction as the reactor although its cross-sectional area will usually be much smaller than that of the reactor. It will therefore be appreciated that although the conversion of the sulphur-containing fuel to a substantially sulphur-free combustible fuel gas takes place under net reducing conditions (e.g. between 13% and 60% of stoichiometric oxygen, more preferably 13% to 25%, more preferably 18 to 20% oxygen required for complete fuel oxidation) in the reactor bed, the zone of the reactor bed immediately above the distributor will tend to be oxidizing. Use of this phenomenon is made in one preferred method of performing the invention.

It is also preferred that the rate of gas flow through both the reactor and regenerator beds should be sufficiently high to prevent "slumping" or defluidization and not so high that elutriation of solids entrainment becomes unacceptable.

Many non-gaseous fuels, particularly fuel oils, which are convertible to fuel gas by the method of invention, contain contaminatory metals which are detrimental to the working parts of a gas turbine, and it has been found that vanadium, which is the most damaging of these metals, tends to be fixed in the stone in the reactor. The fixing of vanadium is enhanced, in some cases, by the presence of a small proportion of iron in the stone, and another troublesome metal, sodium, also tends to be fixed in the stone, at least to some extent, when the stone contains iron and/or silica. Since most sulphur-fixing stones are most economically obtained from natural sources such as limestone or dolomite, both iron and silica will usually be present in the stone although their quantities can be increased, if desired, by suitable additions.

When reactions (1), (2) and (3) are considered, it is clear, at least from classical chemical theory, that the equilibria will be substantially unaffected by increased pressure, and FIG. 1 of the accompanying drawings shows graphically the percentage of sulphur removed from a sulphur-containing fuel oil at temperatures in the range of 800° to 1100°C.

Although the above reactions are empirically representative for direct absorption of fuel sulphur by, for instance, lime, the existence of an oxidising zone close to the air distributor at the base of the reactor bed complicates the picture and in practice, tends to restrict the reactor bed upper temperature limit to about 900°C for complete sulphur removal under atmospheric pressure.

Figure 2:
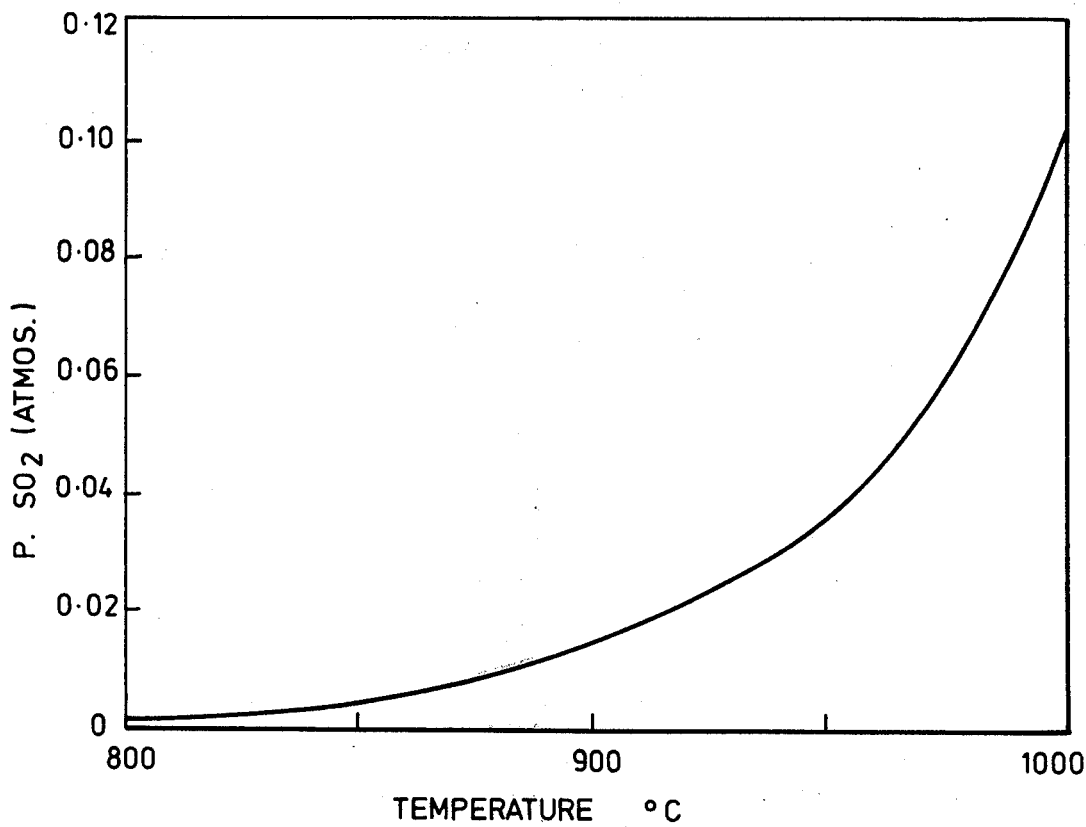

The oxygen-containing gas, such as air entering through the distributor causes some oxidation of calcium sulphide in the bottom of the reactor bed with the consequent release of sulphur dioxide. It is the rise of $SO_2$ concentration with rising temperature that is thought to be responsible for the fall in sulphur removal efficiency apparent from FIG. 1. The reactions involved in the vicinity of the distributor are empirically the same as those in the regenerator and are again listed below. The relationship between $SO_2$ partial pressure and temperature is shown in FIG. 2.

$$CaS + 1\tfrac{1}{2} O_2 \rightleftharpoons CaO + SO_2 \qquad 4.$$

$$CaS + 2O_2 \rightleftharpoons CaSO_4 \qquad 5.$$

$$CaS + 3CaSO_4 \rightleftharpoons 4CaO + 4SO_2 \qquad 6.$$

Below 900°C, $SO_2$ released in this way is totally re-absorbed in the gasification reducing zone higher in the reactor bed. The re-absorption can be summarised by Reaction (7).

$$CaO + SO_2 + 3CO \rightleftharpoons CaS + 3CO_2 \qquad 7.$$

Figure 3:
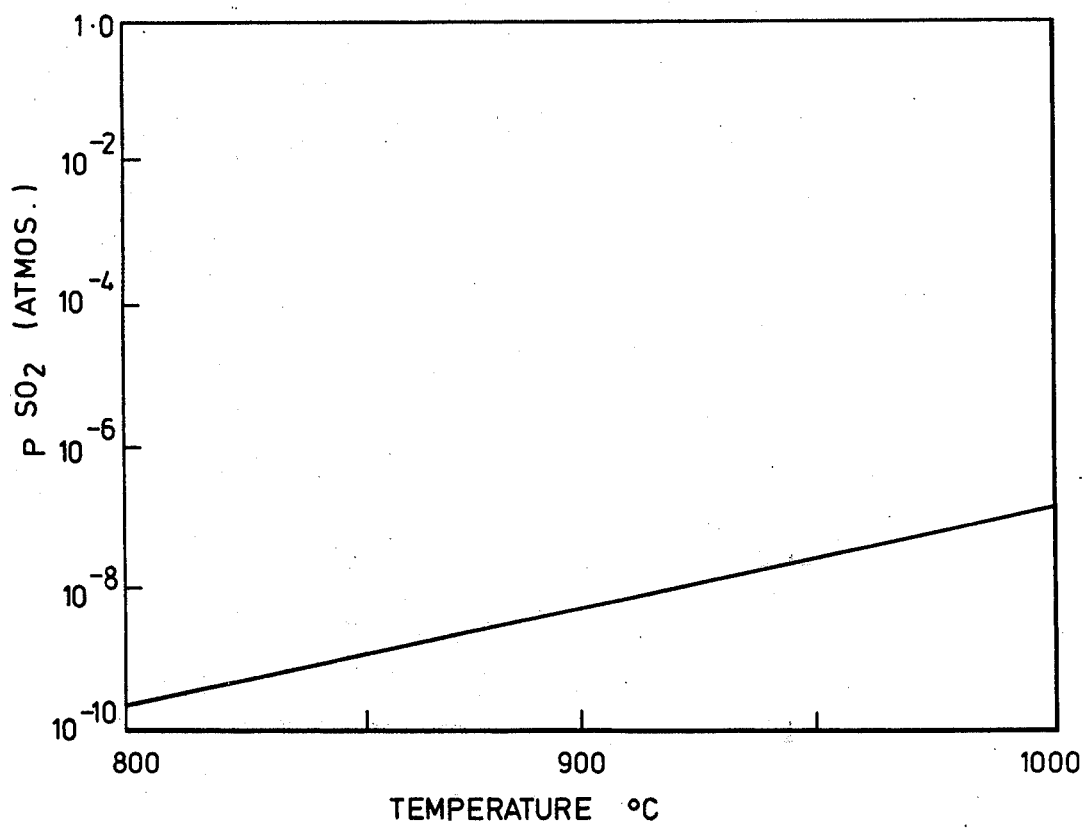

The $SO_2$ partial pressure/temperature relationship for this reaction shows that virtually total re-absorption should be maintained up to at least 1000°C (FIG. 3), from which it has been concluded that the upper temperature limit is not due to thermochemical limitations. It is probably due to the rapid increase in sulphur loading on the top part of the reactor bed imposed by reactions (4) to (6) and re-absorption is, therefore, likely to be kinetically controlled. It is therefore clear that operating the reactor at a higher pressure in accordance with this invention improves re-absorption, the range of operating temperature being extended upwards as a result.

The fuel gasification in the reactor bed can tend to cause carbon or carbonaceous material to be deposited on the stone, particularly when gasification is effected at low stoichiometric ratios (e.g. lower than 20% oxygen) with some heavy fuel oils. It has been found that carbonaceous deposits adversely affect the sulphur-fixing capacity of the stone and hence it is desirable to reduce the carbon lay-down as far as possible. Moreover, carbon deposited on the stone which is transferred to the regenerator reacts with oxygen supplied to the regenerator with the release of considerable quantities of heat. The heat which may thus be released represents a wastage of the heat value of the original fuel and tends to complicate the operating characteristics of the regenerator as will be apparent hereinafter when the control of the regenerator is dealt with.

It has been found that the rate of carbon burn-off from the stone in the oxidising zone of the reactor bed is particularly important when operating in the region of 20% stoichiometric air with typical fuel oils of c. 3 wt.% sulphur content. Only at temperatures in excess of 840°C it is high enough during atmospheric operation. Experimental results indicate that this is due to an increase in the proportion of CO as opposed to $CO_2$ formed with rising temperature, the $CO_2/CO$ ratio being found to decrease from 2 to 800°C to 1 at 840°C.

Thermodynamically, the situation is best described by the following reactions:

$$C + O_2 \rightleftharpoons CO_2 \qquad 8.$$

$$C + CO_2 \rightleftharpoons 2CO \qquad 9.$$

Figure 4:
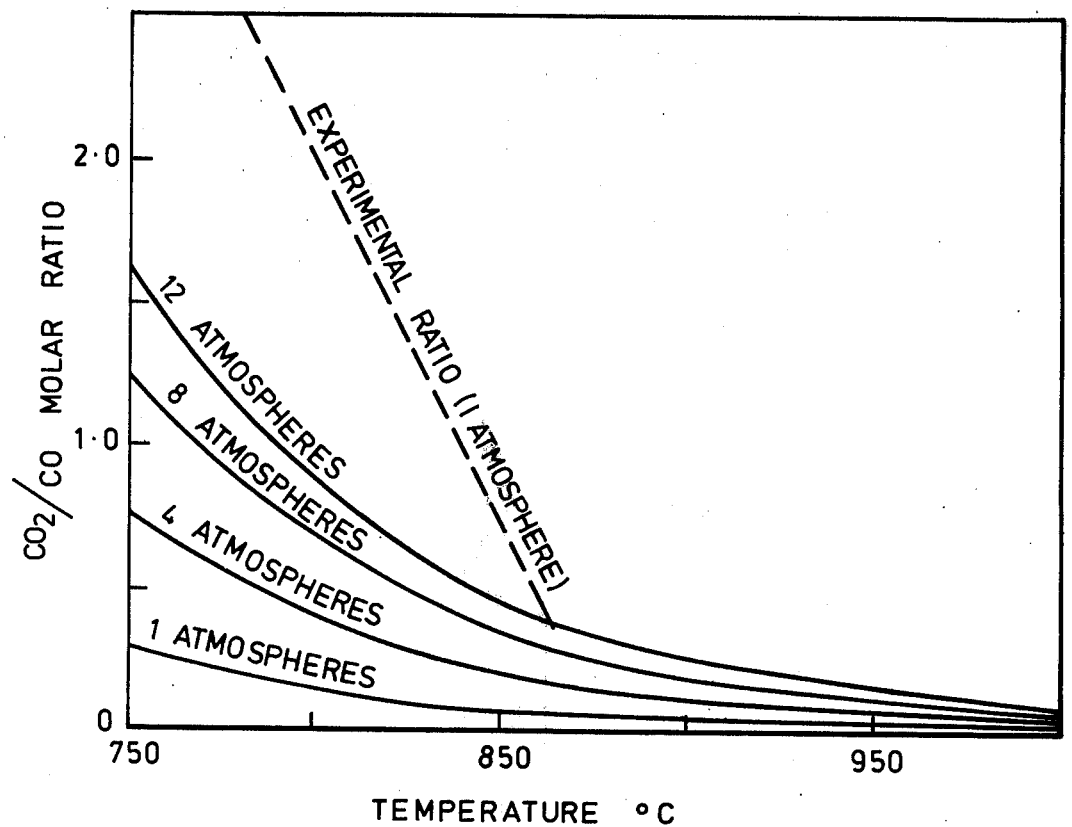

Since reaction (8) goes virtually to completion over the 750°C to 1000°C temperature range and is unaffected by pressure, only reaction (9) need be considered. The predicted $CO_2/CO$ ratios over the above temperature range are shown in FIG. 4 for pressures up to 12 atmospheres together with a corresponding line as experimentally determined at 1 atmosphere. At 1 atmosphere and 840°C the experimental $CO_2/CO$ ratio is higher than equilibrium data predicts, indicating kinetic limitations. At 12 atmospheres, even though there is a seven-fold increase in $CO_2/CO$ ratio at 840°C, the equilibrium line is still well below the experimental one. Consequently, the reaction will not be limited, thermochemically, up to at least 12 atmospheres, and therefore carbon burn-off rate will not be affected either.

Raising the reactor pressure will increase the equilibrium partial pressures of water and carbon dioxide in the product fuel gas and will, therefore, increase the temperature at which hydration and re-carbonation of the lime take place (Reactions (10) and (11)).

$$CaO + H_2O \rightleftharpoons Ca(OH)_2 \qquad 10.$$

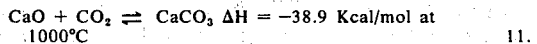

$$CaO + CO_2 \rightleftharpoons CaCO_3 \quad \Delta H = -38.9 \text{ Kcal/mol at } 1000°C \qquad 11.$$

Figure 5:
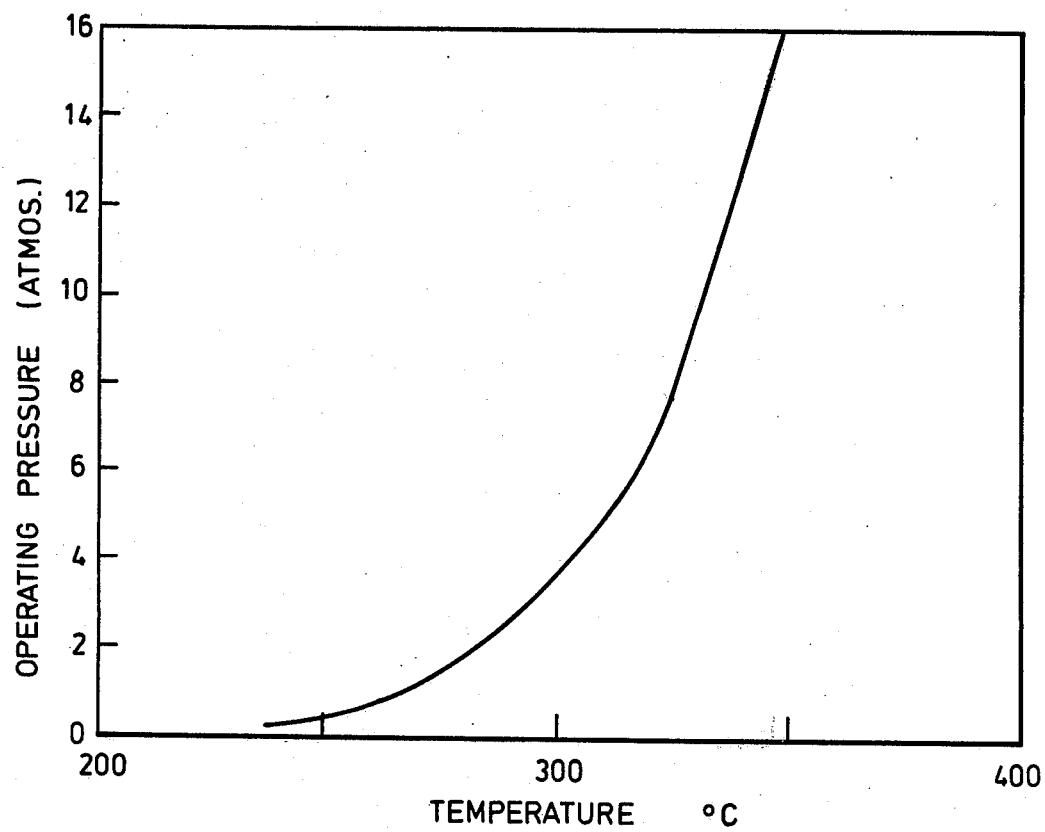

FIG. 5 shows the stability curve for $Ca(OH)_2$ at unit operating pressure up to 16 atmospheres. A product fuel gas water content of 2% by volume has been assumed for the calculations from which the curve of FIG. 5 has been derived since this is a generally representative water concentration. At 16 atmospheres gauge, the hydration temperature will only rise to 420°C and hence hydration of the lime is not a problem in pressurised operation.

Figure 6:
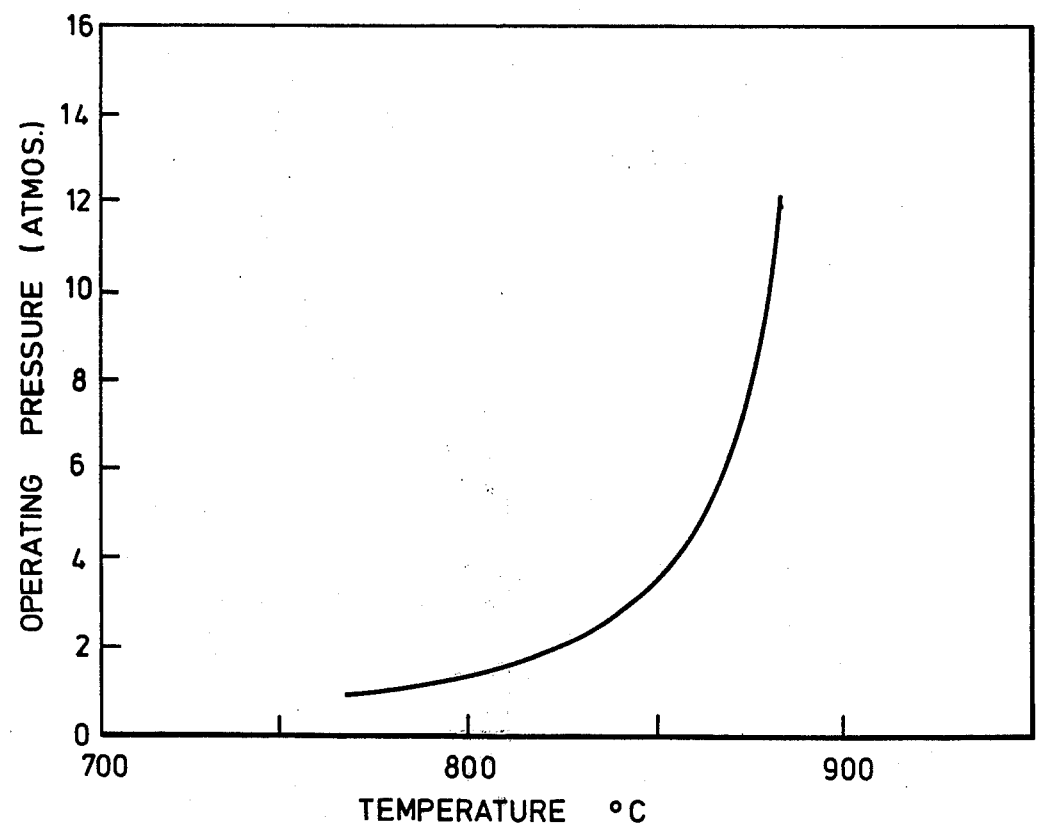

The stability curve for calcium carbonate is shown in FIG. 6. In producing this curve, the variation in $CO_2$ concentration with temperature which was discussed earlier (FIG. 4) has been taken into account. It is evident that the bed temperature must be maintained above 890°C to prevent re-carbonation if reactor pressures in excess of 8 atmospheres are used.

The principal reactions involved in regeneration of sulphided lime in the regenerator are listed below:

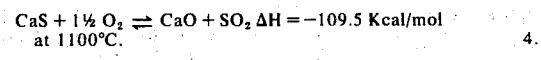

$$CaS + 1½ O_2 \rightleftharpoons CaO + SO_2 \quad \Delta H = -109.5 \text{ Kcal/mol at } 1100°C. \qquad 4.$$

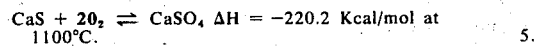

$$CaS + 2O_2 \rightleftharpoons CaSO_4 \quad \Delta H = -220.2 \text{ Kcal/mol at } 1100°C. \qquad 5.$$

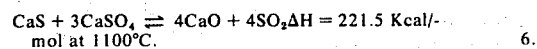

$$CaS + 3CaSO_4 \rightleftharpoons 4CaO + 4SO_2 \quad \Delta H = 221.5 \text{ Kcal/mol at } 1100°C. \qquad 6.$$

Figure 7:
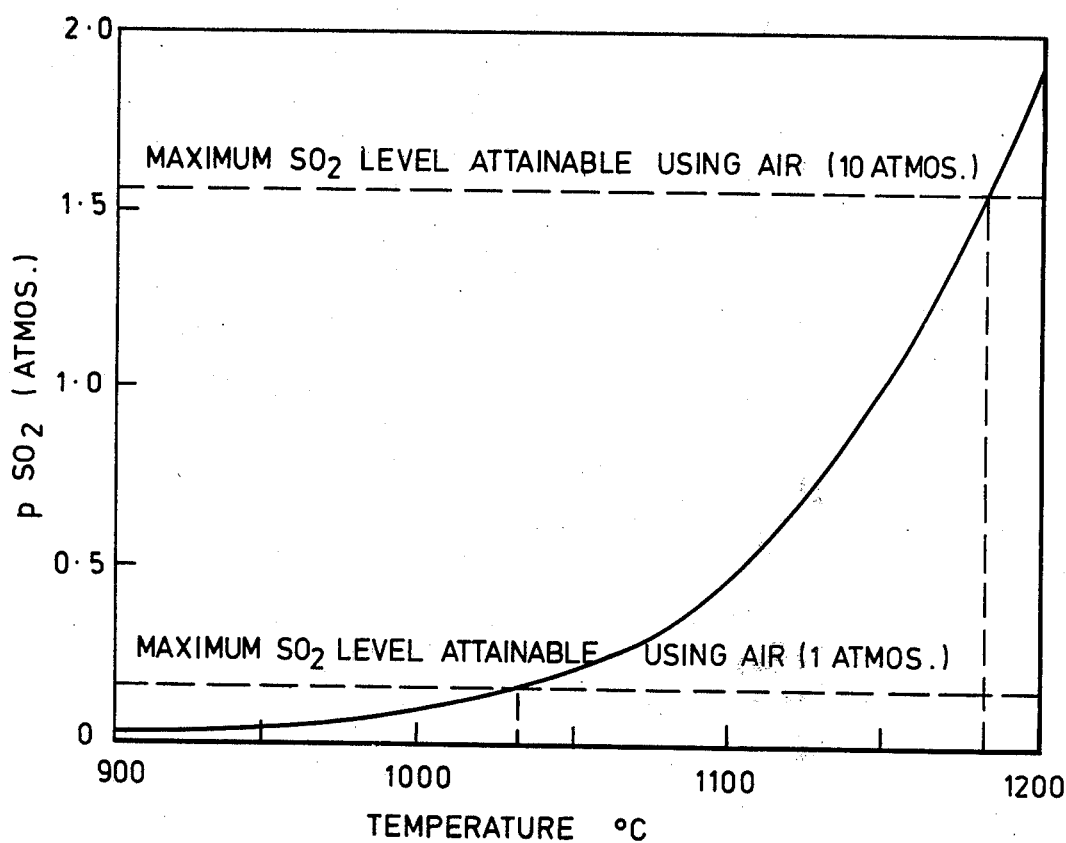

The relationship between equilibrium $SO_2$ partial pressure and temperature is shown in FIG. 7. It is apparent that raising the regenerator pressure results in a requirement for higher regeneration temperatures to maintain a useful and economically high concentration of $SO_2$. Raising the regenerator pressure from 1 atmosphere to 10 atmospheres necessitates a rise in regenerator temperature from 1040°C to 1180°C in order that maximum $SO_2$ concentrations may be obtained and minimal calcium sulphate formed.

It is important that the temperature in the regenerator should not be excessively high since the sulphur-fixing activity of the stone tends to be adversely affected by high temperatures. The temperature at which sulphur-fixing activity is adversely affected depends on the time for which the stone is subjected to the temperature, the nature of the stone, and the acceptability of the operator of a degree of de-activation. Generally speaking, 1300°C will be the upper temperature limit for most operations in accordance with the invention using commercially available limestones or dolomites as the source of the stone.

One method by which the regenerator bed temperature is regulated is now described.

According to this method, the gasifying or reactor bed is operated just below the recarbonation temperature and limited recarbonation of, e.g. the lime, is allowed to take place. Consequently, partially recarbonated lime is fed to the regenerator. This, of course, undergoes calcination at the higher temperature at which the regenerator operates and thereby acts as a heat sink material since the calcination reaction is endothermic, excess heat due to the higher sulphur loading being utilised. The amount of recarbonation is controlled directly from the regenerator temperature. The control system is preferably so arranged that too high a regenerator temperature results in an increase in the rate of cooling of the gasifying bed, the reduction in temperature produced giving rise to an increase in the amount of recarbonation. For low regeneration temperatures, the converse would hold. The control of temperature in the reactor bed may be by direct heat exchange by the injection of steam water or flue gas (steam being preferred) or by extracting heat by indirect heat exchange through heat exchange coils in the bed in accordance with the temperature in the bed.

The relationship between reactor pressure and recarbonation temperature has already been referred to and is shown in FIG. 6. At reactor pressures between 8 and 10 atmospheres, the preferred range for pressurized gasifier operation to produce fuel gas for gas turbines, recarbonation takes place between 875° and 880°C. This is within the preferred temperature range of 840° to 900°C for the gasifying bed. At 10 atmospheres when a regeneration temperature of about 1180°C is required, a temperature reduction of 1.5°C below recarbonation temperature is required for the extent of the desulphurisation in the regenerator (i.e. the difference in sulphur content of stone entering and leaving the regenerator), termed the "sulphur differential", to be about 9% by weight based on the lime. This produces a $CaCO_3$ content in the lime of 19% by weight, and a $CO_2$ concentration in the regenerator off-gas of 19.5% by volume. These carbonate and carbon dioxide values are not excessive and do not produce any detrimental effects. In fact, the presence of carbonate may actually increase the active life of the stone in many cases, depending on the operating conditions and the nature of the stone. In practice, in the above case, for example, the temperature of the gasifying bed would not be held at a steady 1.5°C below recarbonation temperature but the control system would be so arranged that it would fluctuate between recarbonating and calcining conditions giving an average $CaCO_3$ content of 19% by weight over a period of time. It has been found that alternating between the two conditions in this way tends to increase the sulphur-fixing activity of the stone and so reduce the necessary replacement rate of fresh lime or dolomite.

Another method by which the regenerator bed temperature may be regulated is based on the discovery that the sulphur content of the stone in the gasifier varies throughout the depth of the reactor bed both in concentration and in the form in which it is held. At the base of the bed, the sulphur is held as $CaSO_4$ and its concentration may be appreciably lower than that of the sulphur held as CaS at higher levels. At temperatures in the region of 1100°C, CaS and $CaSO_4$ react to release $SO_2$ according to the reaction $$3\ CaSO_4 + CaS \rightleftharpoons 4\ CaO + 4\ SO_2 \qquad 6.$$

This reaction is endothermic, and in accordance with this method of temperature control, the temperature of the regenerator at low stone circulation rates is regulated by transferring some stone from the top of the gasifier bed to the regenerator bed and the balance from the bottom of the gasifier bed. It should be noted that whilst the above reaction consumes no oxygen, nevertheless thermodynamic considerations will limit the concentration of $SO_2$ and any excess supply of oxygen to the regenerator will tend to cause the formation of $CaSO_4$ by upsetting the equilibrium.

$CaSO_4$ and CaS can exist together, it has been discovered, in the presence of an adequate partial pressure of $SO_2$. Accordingly, when the $SO_2$ partial pressure is too high, it is necessary to upset the $CaSO_4/CaS/SO_2$ equilibrium if further reaction is to take place by diluting the $SO_2$ with an inert gas in order to reduce the partial pressure of $SO_2$.

In regulating the regenerator temperature by this method, it is necessary to monitor the temperature of the regenerator bed and the sulphur dioxide and/or oxygen content of the gases leaving the regenerator. If the oxygen content, for example, is excessive and the temperature is satisfactory (i.e., between 1100°C and 1225°C, depending on the sulphur loading of the stone and the rate at which it is circulated between the reactor and the regenerator), a signal indicative of excess oxygen will cause an air or oxygen regulating valve to close progressively until the oxygen content of the regenerator off-gases is acceptable (e.g., no more than 1%). If the regenerator bed temperature is excessive, a signal indicative of this fact will cause the proportion of stone transferred from the base of the reactor bed to the regenerator bed to be increased relative to the amount of stone transferred from the top of the reactor bed.

In yet another method of controlling the regenerator bed temperature, a heat transfer fluid may be passed through heat exchange coils immersed in the regenerator bed at a rate which increases with an increase in the bed temperature, and decreases with a decrease in the bed temperature. The rate of passage of the fluid can be under the control of a valve which responds to the temperature of the bed, and/or to the exit temperature of the fluid. Despite the relatively high temperatures of the regenerator bed during operation, a heat transfer fluid such as water or steam may, at least in some instances, suffice to eliminate substantially high temperature erosion of the exterior surface of the heat exchange coil, particularly if the coil is made from or surfaced with a temperature resistant material.

The three types of method of temperature regulation in the regenerator bed may be used separately or in any convenient combination.

The regenerator may be operated at the same pressure or at a lower pressure than the reactor. If the same pressures are employed in the reactor and regenerator, the transfer of stone between the reactor and regenerator may be effected by any known particulate solids transfer means which substantially prevents the passage of gas: examples of such means are described in U.K. patent specification 1,183,937 and U.K. patent specification 1,336,563.

If the regenerator is operated at a lower pressure (e.g. atmospheric pressure) than the reactor, the transfer of the stone may be effected without significant transfer of gases between the reactor and the regenerator by lock-hoppers, a rotary valve system, a dense phase conveyor of the type developed by Warren Spring Laboratory of Stevenage, England and available from companies licensed by the National Research Development Corporation of Victoria Street, London, England, or any other suitable means.

Figure 8:
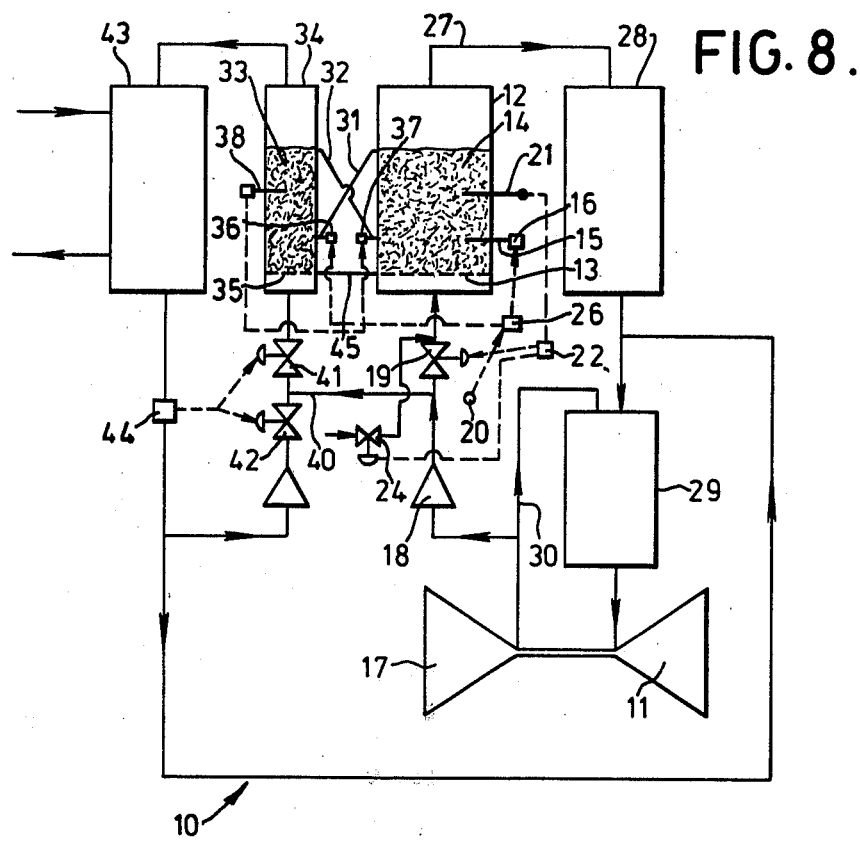
Figure 10:
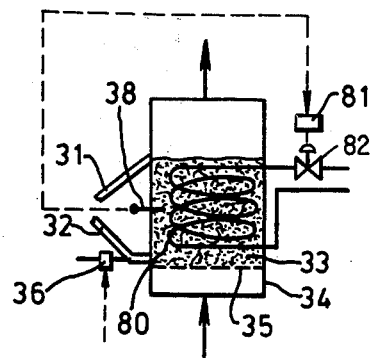
Figure 9:
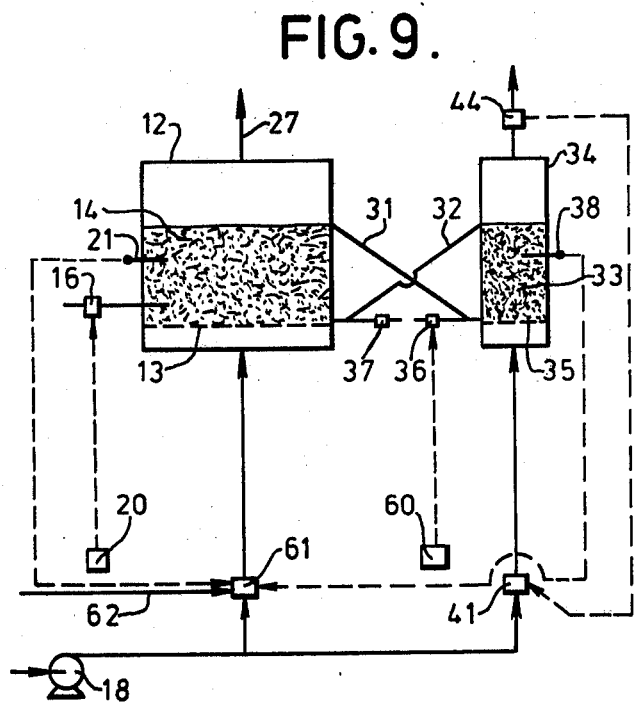

Some illustrative methods of performing the invention are now described with reference to FIGS. 8, 9 and 10, each of which shows a flow diagram, or part thereof, of plant or apparatus in which the process of the invention can be performed. FIG. 8 shows substantially the whole of a plant flow diagram, FIG. 9 shows part of a plant flow diagram, the non-illustrated remainder of the plant optionally having the same arrangement as that of FIG. 8, and FIG. 10 shows schematically the reactor or gasifier and the regenerator, together with ancilliaries, and which could be substituted in or included with plant of the nature described in relation to FIGS. 8 and 9.

FIG. 8 shows a power generating plant 10 including a gas turbine 11 which burns substantially sulphur-free fuel gas produced in a reactor or gasifier 12. The reactor 12 comprises a distributor 13 (e.g. a perforated plate) through which air under pressure is distributed into a bed 14 of lime.

Sulphur-containing fuel such as powdered coal, coal-oil slurry, or fuel oil, is injected into the bed 14 through a number of injectors 15 (only one injector being shown) from a control pump 16. The air is supplied from a compressor 17 mechanically coupled to the turbine 11 and via a circulating blower 18 and a valve 19 and is supplied at 10 atmospheres pressure at a rate sufficient to fluidize the stone particles in the bed 14 and to gasify the sulphur-containing fuel, e.g. fuel oil, at a stoichiometric rate of about 20% with a bed temperature of about 900°C. The rate of fuel supply from pump 16 is determined by the heat load or requirement of the turbine 11, e.g. as signalled from control member 20 via a fuel and stone flow control 26. The temperature in the bed 14 is monitored by a number (only one is shown) of sensors 21, and if the bed temperature is below the desired operating temperature or temperature range in the broad range 800°–1000°C. e.g. for a chosen temperature of 900°C, the supply rate of air to the bed 14 is increased by opening the valve 19 in response to a signal from control 22. If the temperature in the bed 14 should be too high, the valve 19 may be progressively closed until the desired temperature is attained. In order that the superficial velocity of gas through bed 14 remains adequate to fluidize the stone and below a maximum limit at which the entrainment rate becomes unacceptable, an inert diluent which may be flue gas, exhaust gas from the turbine 11 or steam, is mixed with the air downstream of the valve 19 according to the setting of a valve 24. The setting of valve 24 is regulated by the temperature sensitive control 22 which is so constructed, in a manner known to those skilled in the art and which does not explicitly form part of the invention, that the combined flows of air and inert diluent never are too low to prevent defluidization of the bed 14 or too high to cause superficial gas velocities in the bed to exceed a predetermined upper level. The control 22 may also receive flow signals from a suitable flowmeter (not shown) of any known type located in the air/stream line downstream of the valve 19 to monitor and control overall gas flow rates.

The partial combustion of the fuel within the bed 14 is effected very efficiently and in a relatively small volume by virtue of the heat transfer properties of the stone in the bed and the tendency of fluidized beds to be of relatively uniform temperature throughout. The fuel, moreover, being partially combusted within the bed 14 of sulphur-fixing stone is converted to fuel gas and desulphurized at the same time, in effect, and this is of considerable advantage from the point of view of capital cost of the gasification and desulphurization equipment since one unit of compact size is required for both operations — if the gasification and desulphurization were effected separately, not only would two units each of the same order of size as vessel 12 be necessary, but thermal losses would be increased and in addition to the cost of the increased volume and/or area occupied by the two units, the cost of the operations would be increased by the reduced thermal efficiency thereof.

During the partial combustion of the fuel, the sulphur thereof is fixed in the stone as sulphide, and the resulting substantially sulphur-free combustible fuel gas at about 10 atmospheres pressure leaves the reactor 12 via line 27, and passes through a de-duster 28 which traps entrained fines of all but the smaller sizes. The de-dusted gas leaving the de-duster 28 passes into a combustor or combustion chamber 29 wherein it is mixed with that portion of the air from the compressor 17 which has not been employed in the reactor bed 14. The air from the combustor 29 is supplied via line 30, and suitable equipment (not shown) of known type may be provided in line 30 for dumping any unwanted excess of air. In the combustor 29, the fuel gas is fully combusted, and the resulting hot gas mixture is fed into the turbine 11 and exhausted to atmosphere. The exhausted gas may have considerable utilizable heat, and may be passed through heat recovery equipment, including boilers. One such boiler (not shown) may be employed to raise steam for injection to the reactor bed 14 via valve 24. Alternatively or additionally, a portion of the cooled exhausted gas may be compressed to 10 atmospheres and recycled to valve 24, when required.

In order to maintain the sulphur-fixing ability of the bed 14, it is necessary to replace sulphided stone with non-sulphided stone and reduce the proportion of sulphided stone in the bed 14. This is most economically effected by subjecting the sulphided stone to a regeneration process in which its sulphur-fixing properties are substantially restored.

At the region of the normal top of the bed 14, an overflow weir (not illustrated) into a downcomer 31 is provided. The downcomer 31 includes a horizontal section which enters the bed 33 of the regenerator 34 above a distributor 35 through which regeneration gas is distributed substantially uniformly into the bottom of the bed 33. The presence of the horizontal section restricts the free flow of solids through the downcomer 31 and stone therefore tends to pile up in the downcomer 31 and thereby forms a gas seal between the regenerator bed 33 and the reactor bed 34. An inert gas such as nitrogen or flue gas is pulsed into the horizontal section intermittently to transport stone along the horizontal section by entrainment and fluidization. The amount of inert gas required for this is very small in comparison to other gas flows in the apparatus. The control of the rate of inert gas pulsing is effected from regulator 36, and the setting of the regulator 36 is fixed by the setting of the fuel flow control 26: thus, as the rate of fuel injection (and therefore of sulphur transfer) to reactor bed 14 varies, the rate of stone transfer to the regenerator bed (for sulphur removal) varies in a related way (e.g. in direct proportion). Accordingly, sulphur pick-up in the reactor bed 14 is balanced by sulphur-removal in the regenerator bed 33 under steady state operation of the plant. As stone is transferred from the horizontal section of the downcomer 31, further quantities of stone will enter the horizontal section between the inert gas pulses.

The top level of the bed 33 is approximately at the level of an overflow weir (not indicated) at the entrance to a return downcomer 32 having a horizontal section at its bottom end and which is substantially the same in construction as downcomer 31, and the downcomer 32 is similarly provided with a regulator 37 for regulating the interval between pulses of inert gas which are blown into the horizontal section thereof to transport stone into the reactor bed 14.

A number of temperature sensors 38 (only one is shown) are provided in the bed 33, and signals depending on temperature control the inert gas pulse regulator 37. As the regenerator bed temperature increases (and decreases), the signals from sensors 38 cause the regulators 37 to increase (and decrease) the rate of inert gas pulsing and thereby to increase (and decrease) the rate of stone transfer out of bed 33.

The changing stone transfer or flow rate out of bed 33 via downcomer 32 could be matched by changing the rate of stone flow into the bed 33 via downcomer 31. In this type of operation, the heat released by the exothermic regeneration reactions would be removed only by the sensible heat required to increase the stone temperature from the reactor bed temperature (e.g. 900°C) to the regenerator bed temperature (e.g. 1200°C). Generally, the stone circulation rates in this type of temperature control method would be considerably higher than that required merely for sulphur transport, and other expedients are preferred for control of regenerator bed temperature in order that lower and generally more acceptable stone transfer rates may be employed.

In this embodiment, a stone transfer port (or duct) 45 is provided between the beds 14 and 33 to connect bottom regions of the beds just above their distributors 13, 35. There may be more than one port (or duct) 45 to provide for free communication between the beds 14, 33.

If, as a result of rising temperature in bed 33, stone is transferred at an increased rate to bed 14 by the temperature controlled gas pulse regulator 36, the height of stone in bed 14 will increase while that in bed 33 will decrease. Thus, a pressure differential of stone will be set up between the beds 14, 33 which will cause stone from the base of bed 14 to pass to the base of bed 33. The stone at the base of bed 14 will have been in contact with air entering the bed 14 via the distributor 13 and will contain a high proportion (in relation to the rest of bed 14) of $CaSO_4$. The temperature of the $CaSO_4$-containing stone will generally be close to the average temperature of the bed 14. The $CaSO_4$ of the stone which passes into bed 14 will react with sulphide in bed 33 according to the endothermic reaction (6) thereby chemically "removing" heat from regenerator bed, and increasing $SO_2$ production therefrom without any increase in the $O_2$ supplied to the bed 33. Sulphated stone will continue to pass from bed 14 to bed 33 via port 45 until the pressure due to the relative bed heights is substantially zero (at approximately equal bed heights). It will be appreciated that if the static pressure of stone in the bed 33 is greater than than in bed 14, a flow of sulphided stone to the base of bed 14 will take place through port(s) 45, and the endothermic reaction (6) will take place to an increased extent in bed 14. The amount of material thus transferred will be small and will have an insignificant effect in the bed 14. Generally speaking, however, the flow of stone through port(s) 45 will be from bed 14 to bed 33. If the sulphur content of regenerated stone in downcomer 32 is arranged to be about 9 wt.% lower than the sulphur content of sulphided stone in downcomer 31, then if the heat output from the oxidation of carbon in bed 33 is ignored and on the basis that the endothermicity of reaction (6) balances, on average, the heat production from reaction (4), (reaction (5) taking place to a negligible extent at regeneration temperatures), the 9% sulphur removal in bed 33 will be made up of about 6.6 wt.% sulphur supplied as sulphide via downcomer 31 and 2.5 wt.% supplied as sulphate via port(s) 45. If temperatures of 1215°–1220°C can be tolerated in the regenerator bed 33, the $SO_2$ concentration in the off-gas will be about 21.7%. This range of temperature will usually be too high for economy with most stones, and by diluting the air with recycled cooled stripped off-gas, as described below, a more tolerable temperature of about 1180°C is obtained for a $SO_2$ concentration of about 15%.

In the regenerator 34, air supplied via the compressor 17 and blower 18 and passed via a line 40 and a regulator valve 41, is distributed into the base of the bed 33 by the distributor 35. The partial pressure or concentration of oxygen in the air supplied to the regenerator 34 is varied, when necessary, by dilution with regenerator off-gas from which $SO_2$ has been removed. The amount of regenerator off-gas recycled after $SO_2$ removal is governed by the setting of a recycle valve 42.

The regenerator reactions in bed 33 are summarized as reactions (4), (5) and (6) and the overall exothermicity of the regeneration reactions is relatively high, so that the temperature in bed 33 tends to remain at least at a minimum temperature.

The off-gas from bed 33 is led to an $SO_2$ scrubber 43 in which the off-gas may also be cooled. In the scrubber 43, the off-gas is contacted with an $SO_2$-removing material, preferably a liquid such as water or dilute sulphurous or sulphuric acids, which will dissolve $SO_2$ at the operating pressure, and release the $SO_2$ at atmospheric pressure whereby substantially pure $SO_2$ may be recovered as a useful by-product. The scrubbed gas is substantially oxygen-free air. If the scrubbed gas contains an excessive level of oxygen (e.g. 1%) as determined by an oxygen monitor 44, the air regulator valve 41 is partly closed to reduce the oxygen content of the gas passing to the regenerator 34. If the regenerator off-gas has too high an $SO_2$ content (before scrubbing), the recycle valve 42 is opened to dilute the regenerator inlet gas. An $SO_2$ monitor (not shown) is provided in the regenerator off-gas line, and signals representative of $SO_2$ contents in excess of a selected maximum (e.g. 15%) are recycled to the recycle valve 42 in known manner to cause the recycle valve to open until, at most, the $SO_2$ concentration is equal to the selected maximum.

The valve 41 incorporates a flow rate monitor (not shown), and when the total flow to the regenerator is almost so low that defluidization is likely, or almost so high that excessive solids elutriation will occur, signals from the flow rate monitor override (in known manner) the signals from the $O_2$ monitor 44 to set the valve 41 at openings to prevent defluidization or excessive elutriation.

Reference is now made to FIG. 9 which shows another method of operation in accordance with the invention in which the endothermal calcination of partly carbonated lime is used to absorb part of the heat of the regeneration reaction. Items which are common to FIGS. 8 and 9 are given the same reference numerals, for the most part, in FIG. 9, wherein the reactor 12 is shown on the left and the regenerator 34 on the right, fuel being injected by pump 16 in accordance with the demand for gas as set by load controller 20. The flow of stone from reactor 12 to regenerator 34 is controlled by regulator 36, and the return flow via downcomer 32 is controlled by a regulator 37 which responds to bed level signals from a level detector (not illustrated of any suitable type in bed 33 to maintain the level of bed 33 at a desired set point. The setting of the regulator 36 is made proportional to the rate of fuel supply to reactor 12 in response to the signals from the load controller 20. The constant of proportionality is adjusted manually with ratio control 60 in accordance with the sulphur content of the fuel. If the % S in the fuel changes (e.g. due to the use of a different (batch of) fuel, the control 60 must be re-set, e.g. to increase the rate of stone transfer when the fuel sulphur content is increased. When the regenerator temperature rises towards a pre-determined maximum temperature, the signals from monitor 38 received by a regulator 61 actuate the regulator to reduce the concentration of oxygen in the gas passing to the reactor bed 14 by mixing with the air from blower 18 an appropriate amount of cool diluent gas from line 62, which may conveniently be flue gas and/or steam. The gasification of the fuel in the bed 14 accordingly takes place with less intensity (as the fuel/$O_2$ ratio has fallen in the bed) and the temperature of bed 14 falls. Signals of reaction bed temperature may be supplied to the regulator 61 by the monitor 21. At 10 atmospheres pressure in the reactor and regenerator, the reactor would be operated at a temperature of about 875°C for a fuel oil having a sulphur content of about 3 wt.%, and a reduction from the normal operating temperature by 1 or 2° C will be adequate to promote the formation of carbonate in the stone — this is an exothermic reaction. The carbonate stone, when passed to the regenerator bed 33, is calcined at the higher temperature therein and the heat of carbonation previously released in the reactor bed 14 is absorbed in the regenerator bed 33 as $CO_2$ is liberated. The $CO_2$ will dilute the $SO_2$ and if stripping of the $SO_2$ is to be performed for $SO_2$ recovery, the stripping may have to be selective for $SO_2$. On the other hand, if the $SO_2$ is to be converted to other products e.g. sulphur acid or elemental sulphur, the presence of $CO_2$ will not be detrimental in most cases.

The regulator 61 can be constructed and arranged, by means known in the art, to take account of transient temperature conditions in the bed 14 by the appropriate use of integral, proportional and differential control of the dilution of the air from blower 18 with the inert gas from line 62. The oxygen for regeneration in the bed 33 is determined by the oxygen (as detected by monitor 44 of FIG. 8) in the regenerator off-gas. When the superficial velocity in the regenerator bed is between acceptable minimum and maximum values, no inert diluent need be provided in the gas passing to the regenerator. However, at low superficial velocities below which defluidization will occur, inert gas is provided in the regenerator ingoing gas, and as the oxygen requirement of the regenerator bed 33 falls, the inert gas rate is correspondingly increased to prevent defluidization.

Figure 9A:
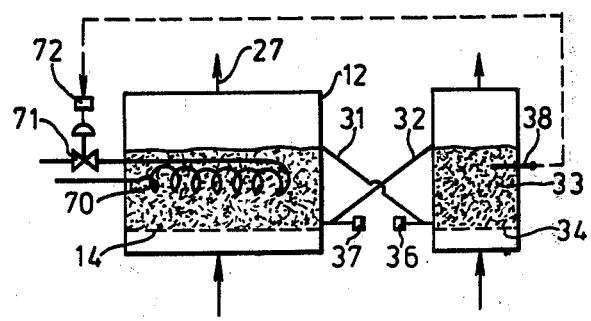

In FIG. 9A, the control of temperature, and hence of recarbonation, in bed 14 is effected by the amount of heat removal from the bed 14 by indirect heat exchange with a heat exchange (instead of the direct heat exchange with the inert diluent from line 62 of FIG. 9). The heat exchange fluid may be steam, for convenience, passing through coils 70 immersed in bed 14. The rate of steam throughput is regulated by valve 71 whose setting is fixed by a controller 72.

When the temperature in the regenerator bed 33 rises, corresponding signals from monitor 38 cause the controller 72 to open the steam valve 71, thereby increasing the rate of heat removal from the bed 14. The controller 72 may be constructed and arranged in the same way as the regulator 61 of FIG. 9 to take account of transient temperature fluctuations in bed 14. A temperature probe (not shown) corresponding to monitor 21 of FIG. 9 would be required for the controller 72 to operate in this way.

At low oxygen requirements for regeneration in bed 33, inert gas is provided in the gas supplied to the regenerator to prevent defluidization in the manner described in relation to FIG. 8.

In the embodiment of FIG. 10, control of the regenerator bed temperature is effected by indirect heat transfer. In this embodiment, a heat transfer fluid, conveniently steam, is passed through heat transfer coils 80 at a rate which increases (and decreases) as the temperature of the bed 33 increases (and decreases). Signals of temperature from the monitor 38 are received by a regulator 81, which may be of the same type of construction and arrangement as the regulator 61 of FIG. 9 and the controller 72 of FIG. 9A. When the temperature in bed 33 increases, the regulator 81 causes a steam value 82 to open progressively thereby to increase the heat removed from the bed 33. Defluidization of bed 33 at low oxygen requirements is ensured by providing inert gas in the air passing to the regenerator, as described in relation to FIG. 8.

It will be appreciated that although different ways of control are separately shown in FIGS. 8, 9, 9A and 10, the expedients adopted in different figures may be combined without departing from the invention. Thus, the control system of FIG. 8 may be employed in a system which also uses the control system of FIG. 9, etc.

We claim:

1. A method for producing a substantially sulphur-free combustible fuel gas from a sulphur-containing fuel comprising: feeding a sulphur-containing fuel into a bed of particles comprising an alkaline earth metal oxide and contained within a reactor, said bed of particles being fluidized by an upwardly flowing stream of an oxygen-containing gas at a superatmospheric pressure, the rate of supply of said oxygen-containing gas and the partial pressure or concentration of oxygen therein being so adjusted in relation to the fuel feed rate that the oxygen supplied is insufficient for complete combustion of the fuel, whereby the sulphur-containing fuel is partially combusted at a temperature in the range from about 800° to about 1000°C. which is varied above and below the recarbonation temperature of said alkaline earth metal oxide at the superatmospheric pressure employed such that the average temperature in the reactor bed is below the recarbonation temperature of the alkaline earth metal oxide whereby a portion of the alkaline earth metal oxide is converted to the corresponding carbonate and a substantially sulphur-free combustible gas is formed as the result of the sulphur from the sulphur-containing fuel becoming fixed in the particles of the bed as an alkaline earth metal sulphide by reaction with the corresponding alkaline earth metal oxide in the particles; recovering a substantially sulphur-free combustible gas from the reactor bed; transferring particles comprising an alkaline earth metal carbonate and an alkaline earth metal sulphide from a first region of the reaction bed of particles to a first region of a regenerator wherein said particles are contained and contacted with an upwardly flowing stream of an oxygen-containing gas at a temperature within the range from 1035°C. to 1300°C., whereby said alkaline earth metal sulphide and said alkaline earth metal carbonate are converted to the corresponding alkaline earth metal oxide with the liberation of sulphur dioxide and carbon dioxide, the temperature in said regenerator being at least partially controlled by controlling the amount of alkaline earth metal carbonate actually formed in said reactor.

2. The process of claim 1 wherein the sulfur-containing fuel is partially combusted at a temperature within the range from about 840° to 900°C.

3. The method of claim 1 wherein said alkaline earth metal oxide is calcium oxide.

4. The process of claim 2 wherein said bed of particles in the reactor comprises about 19 wt. % alkaline earth metal carbonate.

5. A method for producing a substantially sulphur-free combustible fuel gas from a sulphur-containing fuel comprising: feeding a sulphur-containing fuel into a bed of particles comprising an alkaline earth metal oxide and contained within a reactor, said bed of particles being fluidized by an upwardly flowing stream of an oxygen-containing gas at a super-atmospheric pressure, the rate of supply of said oxygen-containing gas and the partial pressure or concentration of oxygen therein being so adjusted in relation to the fuel feed rate that the oxygen supplied is insufficient for complete combustion of the fuel, whereby the sulphur-containing fuel is partially combusted at a temperature in the range from about 800° to about 1000°C. to form a substantially sulphur-free combustible gas and the sulphur of the sulphur-containing fuel is fixed in the particles of the bed partially as an alkaline earth metal sulphide and partially as an alkaline earth metal sulphate by reaction of said sulphur with the alkaline earth metal oxide in said bed; recovering a substantially sulphur-free combustible gas from the reactor bed; transferring particles from the base of said reactor bed and containing alkaline earth metal sulphate and particles from the top of said reactor bed containing alkaline earth metal sulphide to a first region of a regenerator wherein said particles are contained and contacted with an upwardly flowing stream of an oxygen-containing gas at a temperature within the range from 1035°C. to 1300°C., whereby said alkaline earth metal sulphide and said alkaline earth metal sulfate are converted to alkaline earth metal oxide.

6. The method of claim 5 wherein the temperature in the regenerator bed is controlled, at least partially, by controlling the ratio of particles transferred from the lower portion of the reactor bed and particles transferred from the upper portion of said reactor bed.

7. A method according to claim 6 wherein an off-gas containing $SO_2$ is withdrawn from the regenerator and the concentration of $SO_2$ in the off-gas leaving the regenerator bed is monitored, and wherein the oxygen-containing gas supplied into regenerator bed comprises an inert diluent gas, the concentration or partial pressure of inert diluent gas being varied in accordance with the concentration of $SO_2$ in the regenerator bed off-gases, whereby substantially to control the concentration or partial pressure of $SO_2$ in the regenerator off-gases.

8. The method of claim 5 wherein said alkaline earth oxide is calcium oxide.

* * * * *